United States Patent [19]

Shan et al.

[11] Patent Number: 4,641,259

[45] Date of Patent: Feb. 3, 1987

[54] ADAPTIVE SIGNAL PROCESSING ARRAY WITH SUPPESSION OF COHERENT AND NON-COHERENT INTERFERRING SIGNALS

[75] Inventors: Tiejun J. Shan; Thomas Kailath, both of Stanford, Calif.

[73] Assignee: The Board of Trustees of the Leland Stanford Junior University, Stanford, Calif.

[21] Appl. No.: 572,997

[22] Filed: Jan. 23, 1984

[51] Int. Cl.$^4$ ............................................ G06F 15/31
[52] U.S. Cl. .................................................. 364/724
[58] Field of Search ................ 364/724, 825; 333/166; 328/167

[56] References Cited

U.S. PATENT DOCUMENTS

| | | | |
|---|---|---|---|
| 3,723,911 | 3/1973 | Forney, Jr. | 328/167 |
| 3,732,410 | 5/1973 | Mackenhrie | 364/724 |
| 3,736,414 | 5/1973 | McAuliffe | 364/724 |
| 4,145,747 | 3/1979 | Sakaki et al. | 364/724 |
| 4,184,129 | 1/1980 | Danjon et al. | 364/724 |
| 4,290,139 | 9/1981 | Walsh | 364/724 |
| 4,349,889 | 9/1982 | van den Elzen et al. | 364/724 |
| 4,377,793 | 3/1983 | Horna | 333/166 |

OTHER PUBLICATIONS

Shan, "Adaptive Beamforming for Coherent Signals & Interference", *IEEE Trans. on Acoustics, Speech & Signal Processing* Jun. '1985, pp. 527–536.
Applebaum, "Adaptive Arrays", *IEEE Trans. on Antennas & Propagation*", Sep. 1976, pp. 585–598.
Widrow et al, "Adaptive Antenna Systems"*Proceeding of the IEEE*, Dec. 1967, pp. 2143–2159.
Widrow et al, "Adaptive Noise Cancelling: Principles & Applications", *Proceeding of the IEEE*, Dec. 1975, pp. 1692–1716.
Widrow, "Adaptive Filters" from *Aspects of Network & Systems Theory* edited by Kallmar & Declairs; Holt, Reinhold & Winston, 1970.
Gabriel, "Adaptive Arrays–An Introduction", *Proceeding of the IEEE*, Feb. 1976, pp. 239–272.
Compton, "An Adaptive Array in a Spread-Spectrum Communication System", *Proceeding of the IEEE*, Mar. 1978, pp. 289–298.
Frost, "An Algorithm for Linearly Constrained Adaptive Array Processing", *Proceeding of the IEEE*, Aug. 1972, pp. 926–935.
Gabriel, "Spectral Analysis in Adaptive Arrays Superresolution Techniques"*Proceeding of the IEEE*, Jun. 1980, pp. 654–666.
Widrow et al, "Signal Cancellation Phenomena in Adaptive Antennas: Causes & Cures", *IEEE Trans. on Antennas & Propagation*, May 1982, pp. 469–478.
Gabriel, "Adaptive Superresolution of Coherent RF Spatial Sources" Naval Research Laboratory, Washington, D.C.
White, "Low-Angle Radar Tracking in the Presence of Multipath", *IEEE Trans. on Aerospace & Electronic Systems*", Nov. 1974, pp. 835–852.
Haykin et al., "Evaluation of Angle of Arrival Estimators Using Real Multipath Data", *In Proceedings IEEE Conf. on Acoustics*, Apr. 1983, pp. 695–698.
Shan et al, "Spatial Smoothing Approach for Location Estimation of Coherent Sources", *In Proceedings Seventeenth Asilomar Conf.*, Nov. '83, pp. 367–371.
Shan et al, "Adaptive Beamforming for Coherent Signals & Interference", *In Proceeding Second ASSE Workshop on Spectral Estimation*, Nov. 1983.
Cioffi et al., "Fast,-Fixed Order, Least-Square Algorithms for Adaptive Filtering", *In Proceedings IEEE Conf. Acoustics*, Apr. '83, pp. 679–682.

*Primary Examiner*—David H. Malzahn
*Attorney, Agent, or Firm*—Flehr, Hohbach, Test, Albritton & Herbert

[57] ABSTRACT

Suppression of coherent and non-coherent interferring signals is obtained by a smoothing operation in an adaptive signal processing array by providing a plurality of signal detectors and a plurality of variable weighting means for weighting signals from each of the detectors. The weighting means are grouped in overlapping subgroups of less than all of the plurality of weighing means and the weighted signals from each sub-group are summed. The summed weighted signals of each sub-group are then operated on by an adaptive algorithm to obtain a feedback signal that is applied to adjust the variable weighting means.

6 Claims, 11 Drawing Figures

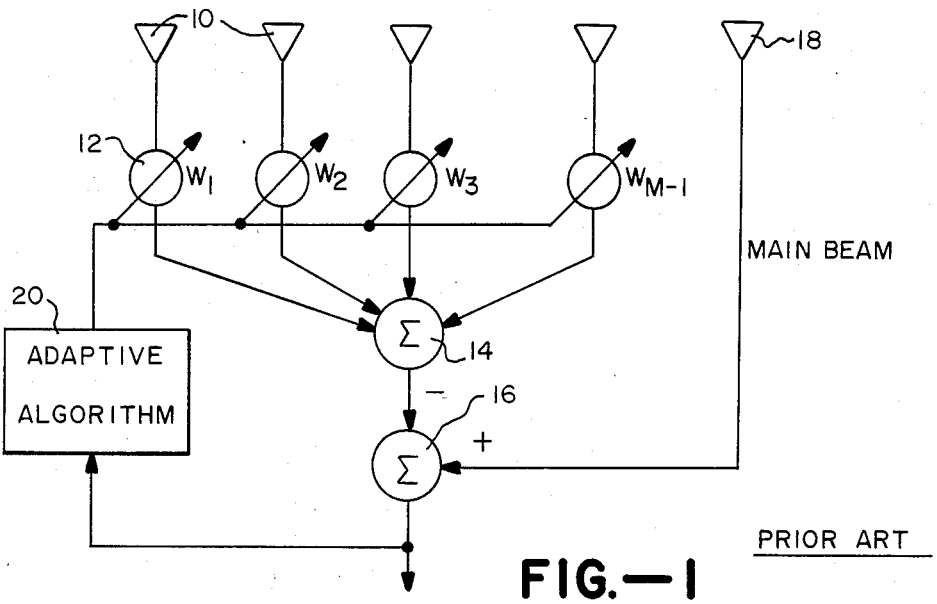
PRIOR ART
FIG.—1
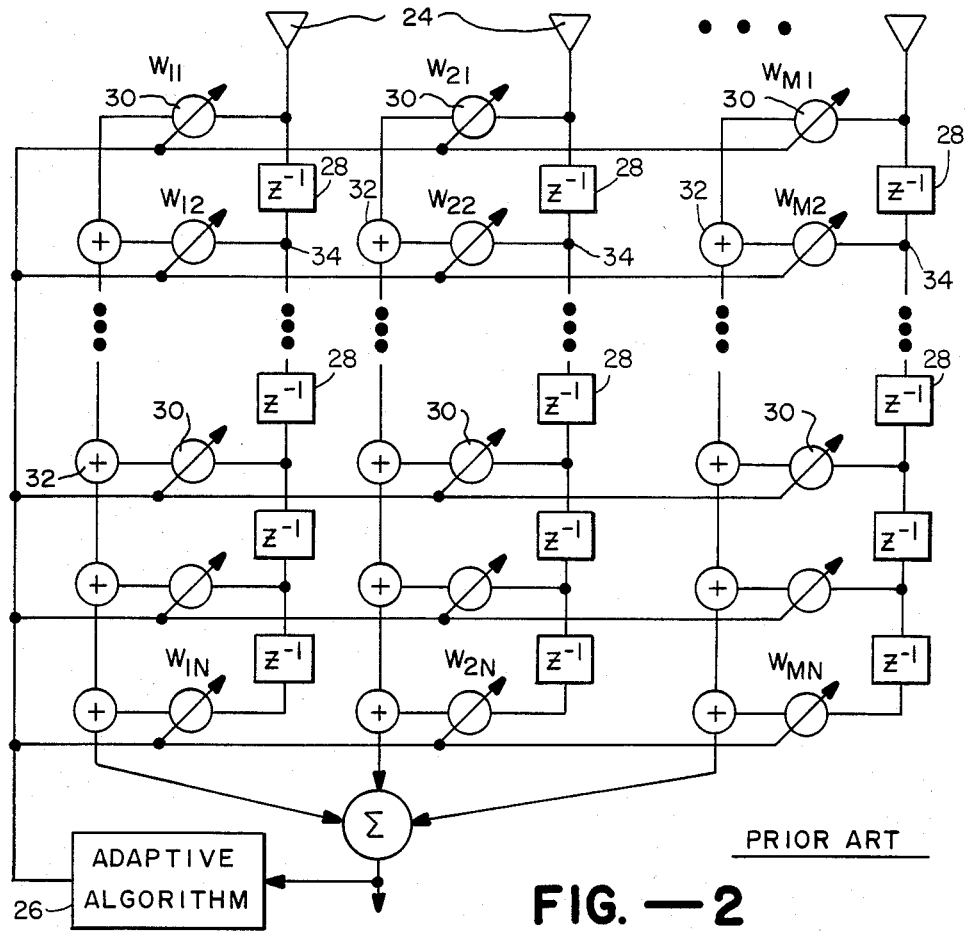
PRIOR ART
FIG.—2

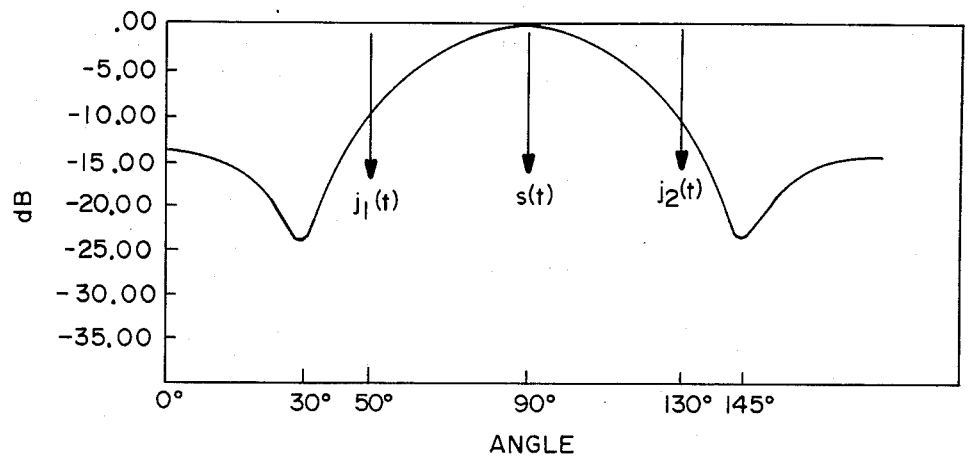
FIG.—3A
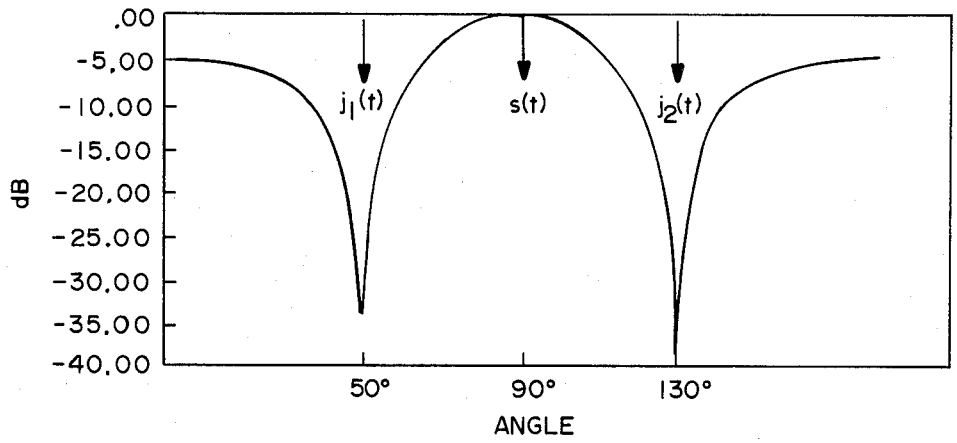
FIG.—3B

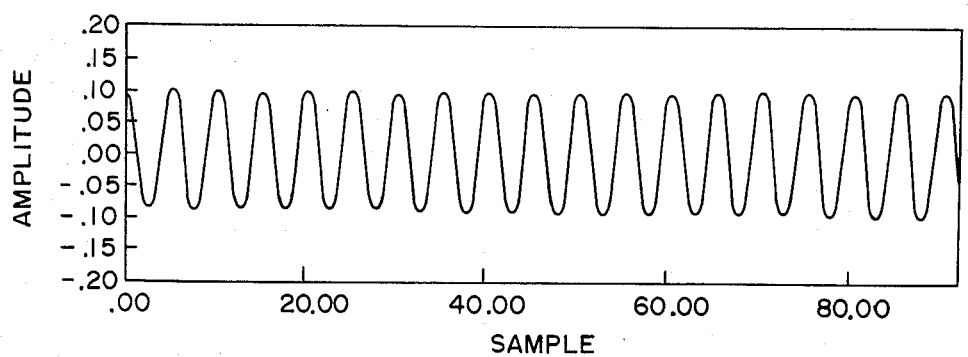
FIG.—4A
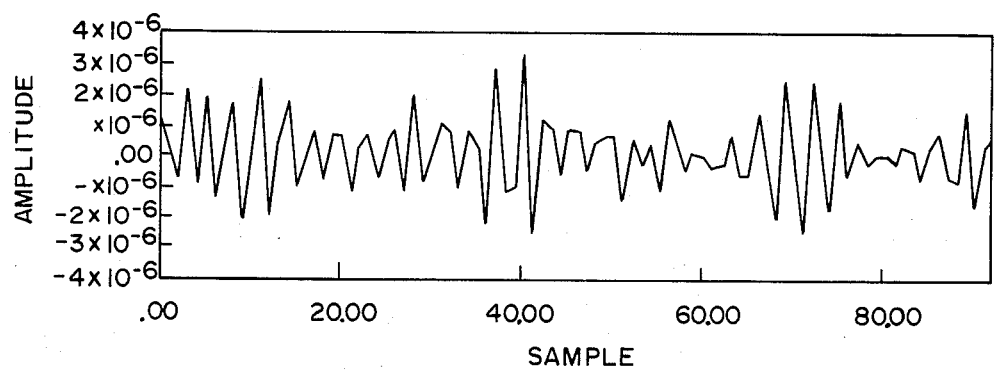
FIG.—4B
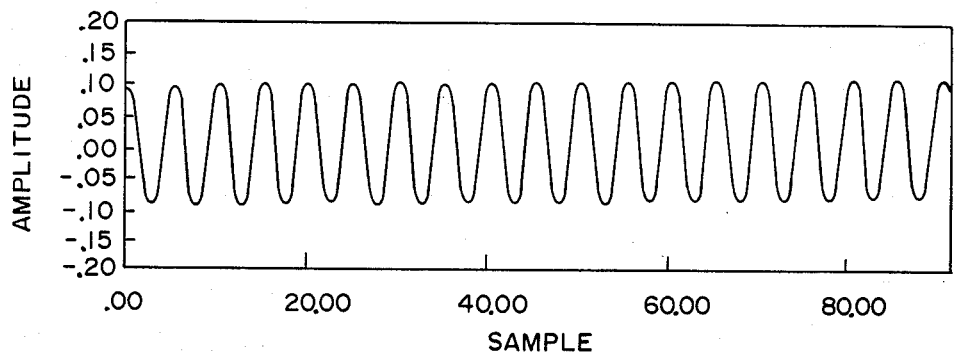
FIG.—4C

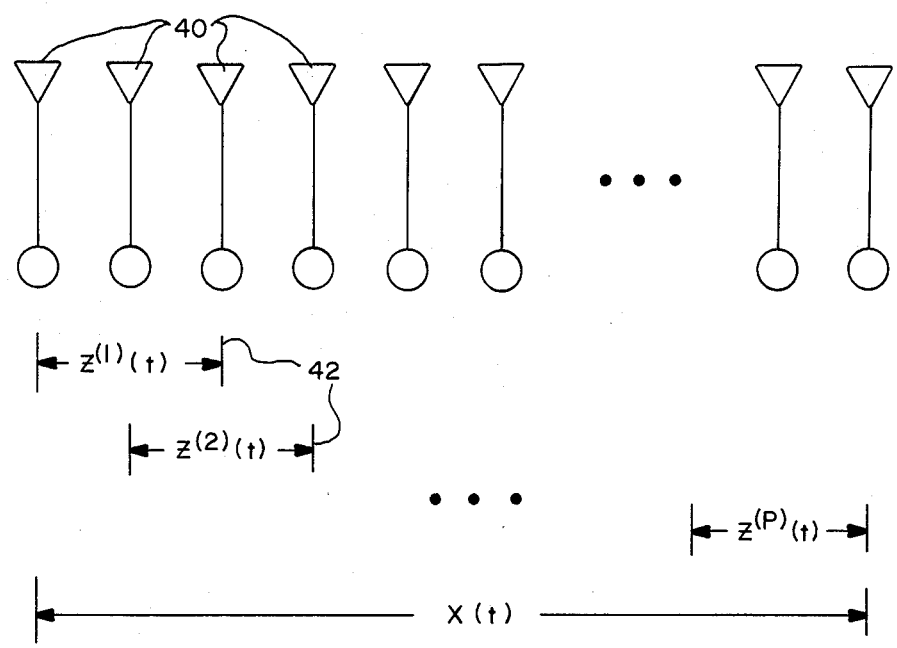
FIG.—5
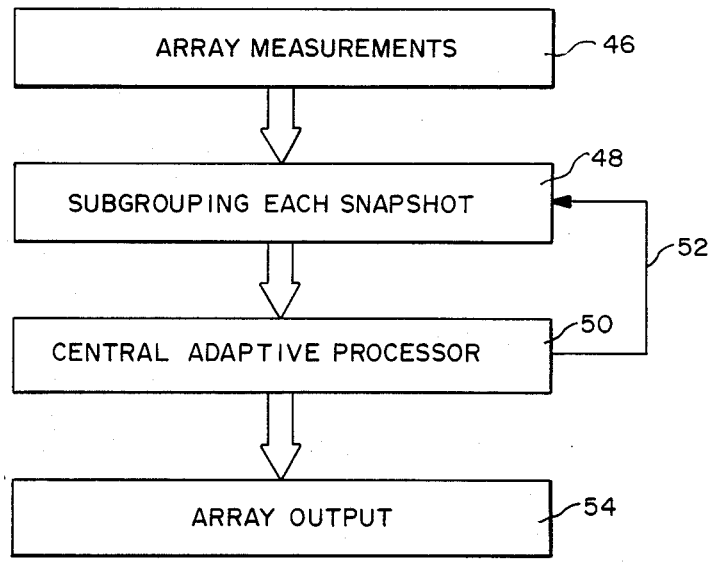
FIG.—6

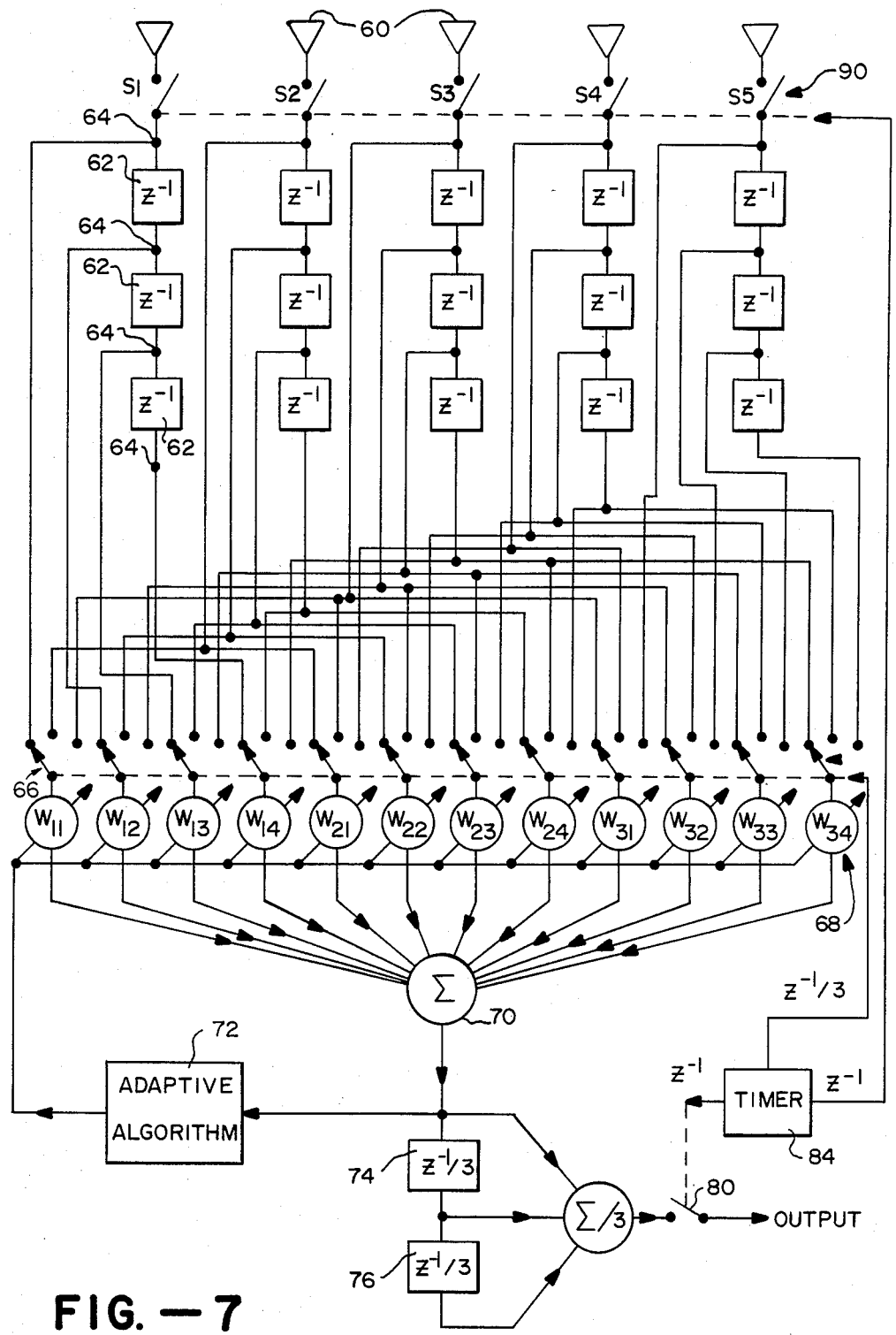
FIG. — 7

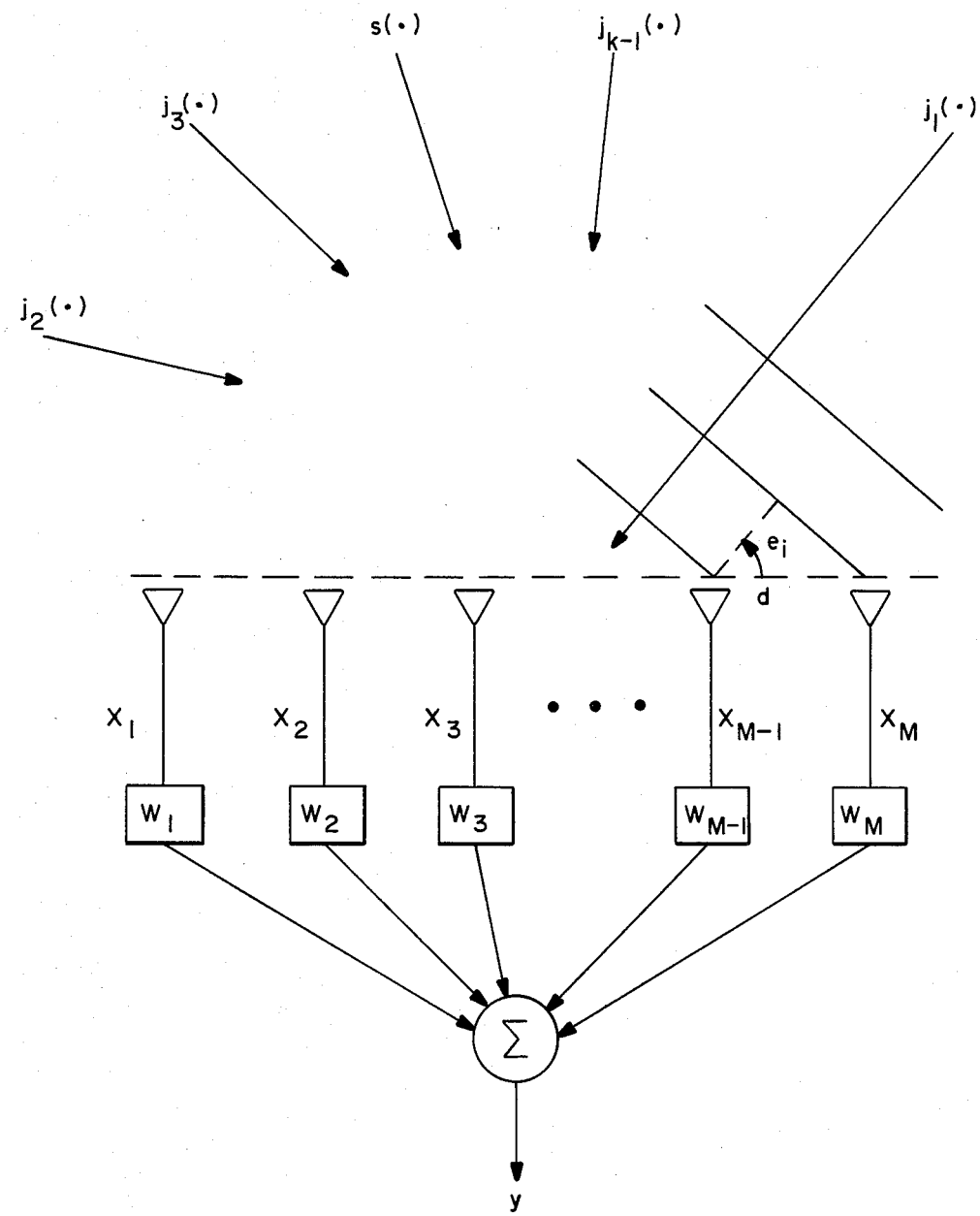
FIG.—8

ADAPTIVE SIGNAL PROCESSING ARRAY WITH SUPPRESSION OF COHERENT AND NON-COHERENT INTERFERRING SIGNALS

The U.S. Government has rights in the invention described and claimed herein pursuant to Contract No. F49620-79-C-0058.

This invention relates generally to adaptive signal processing arrays, and more particularly the invention relates to an adaptive signal processing array that suppresses both coherent and incoherent interferring signals.

The adaptive signal processing array including a plurality of antennas or signal detectors along with an adaptive processor performs filtering in both the space and frequency domains thus reducing the sensitivity of the signal receiving system to interfering directional noise sources. Variable weights of the signal processor are automatically adjusted by a simple adaptive technique based on any one of several known algorithms. See for example, Howells U.S. Pat. No. 3,202,990 for "Intermediate Frequency Side-Lobe Canceller"; Applebaum, "Adaptive Arrays", SPL TR 66-1, Syracuse University Research Corporation, August 1966; Widrow et al, "Adaptive Antenna Systems", *Proceedings of IEEE* 55, pgs. 2143-2159, December 1967.

Details of these several algorithms differ, but all the algorithms are based on the assumption that the desired signals and interferring signals are non-coherent (i.e., do not have a fixed phase difference) with the desired signal. Therefore, a coherent interfering signal, that is, a signal having the same frequency at a fixed phase difference with respect to the desired signal, is not suppressed. Such coherent interfering signals can result from multipath propagation, or from jammers that deliberately induce coherent interference such as by retrodirecting the signal energy to the receiver.

The present invention is directed to an adaptive array processing system and method that suppresses both incoherent and coherent interfering signals by using spatial smoothing in the array. Rather than processing individually each of the plurality of detected signals and then summing the processed weighted signals, as in the prior art, the plurality of signals at each instant in time is divided into overlapping subgroups and the subgroups are processed in succession by an adaptive algorithm. The weight vectors in the array are updated using all subgrouped data. After all the subgroups are processed, the next plurality of signals at the next time period is processed. Importantly, the array structure can be applied in conjunction with any of the known adaptive algorithms and structures of prior art adaptive arrays.

The invention and objects and features thereof will be more readily apparent from the following detailed description and appended claims when taken with the drawing, in which:

FIG. 1 is a schematic diagram of a prior art Howells-Applebaum array.

FIG. 2 is a schematic diagram of a prior art Frost array.

FIG. 3A and FIG. 3B are plots of beam pattern of a Frost array with coherent inputs in accordance with the prior art and in accordance with the present invention, respectively.

FIG. 4A is a plot of input signal of a Frost array and FIGS. 4B and 4C are plots of output signal of the Frost array with coherent signal and interference in accordance with the prior art and in accordance with the present invention, respectively.

FIG. 5 is a schematic representation of an adaptive signal processing array in accordance with the invention.

FIG. 6 is a functional block diagram illustrating the operation of the array of FIG. 5.

FIG. 7 is a detailed schematic of one embodiment of a linear constraint adaptive signal processing array in accordance with the invention.

FIG. 8 is a schematic diagram of an adaptive array for use with a described mathematical analysis of the invention.

Referring now to the drawings, FIG. 1 is a schematic diagram of the prior art Howells-Applebaum adaptive array and processor. The array includes a plurality of antennas 10 for detecting signals with each of the antennas 100 being connected through a weighting vector 12 ($W_1-W_{M-1}$) for weighting each of the signals detected by antenna 10. The weighted signals are then summed at 14 and the summed output is inverted and applied to a second summing node 16. One antenna 18 detects a signal that is considered a reference or main beam, and this reference beam is applied to the summing network 16. The different between the reference signal and the summed signal from 14 is used to update the weighting vectors in accordance with an adaptive algorithm processor 20. By an iterative process of adjusting the weighting vectors, an output signal, Y, is obtained in which incoherent interference is minimized.

FIG. 2 is a schematic diagram of the prior art Frost adaptive array which has a plurality of antennas 24 with each of the signals being time delayed, processed, summed, and then applied to the adaptive algorithm processor 26. For example, the signal at a given time period is applied sequentially through registers 28 which provide a desired time delay. The signals from the antennas 24 and the registers 28 are applied through weighting vectors 30, summed at the node 32, and then cumulatively summed at 34 to derive the signal Y that is applied to the adaptive algorithm 26.

FIGS. 3A and 3B are plots of computer simulated beam patterns of the Frost array of FIG. 2 in accordance with the prior art and in accordance with the present invention, respectively. In FIG. 3A it is noted that the beam pattern has a node defined by nulls of approximately −20 db in the presence of coherent interference but not exactly in the interfering direction. FIG. 3B is a plot of the beam pattern with the same coherent interference but using an array in accordance with the present invention. In this case it will be noted that the beam pattern is defined by nulls of −30 db and −35 db. This assumes that the desired signal is at 90° and two jammers are at 50° and 130°, respectively, and are sinusoids of the same frequency and fixed as the desired signal phase difference (zero in this case).

FIG. 4A is a plot of an input wave to the array process system of FIG. 2, and FIG. 4B shows the computer simulated output waveform using the prior art Frost algorithm and system. It will be noted that the amplitude of the output is on the order of $10^{-6}$ of the input power and the output is primarily static and thermal noise. In this case the system would fail to operate as a receiver unit.

FIG. 4C is the simulated output of the system of FIG. 2 as modified in accordance with the invention. In this case, it will be noted that the output signal is essentially identical to the input signal of FIG. 4A. Accordingly, not only the beam pattern but more importantly also the quality of the processed signal, are improved using the present invention.

FIG. 5 is a schematic representation of an antenna array and the processing of signals in accordance with the present invention. Rather than processing each of the signals from the antennas 40 separately, as in the prior art adaptive arrays of FIGS. 1 and 2, the antenna signals are processed in overlapping subarrays 42. FIG. 6 is a block diagram illustrating the processing of the signals using the array of FIG. 5. The array measurements at each time period or snapshot as shown at 46 are divided into the overlapping sub-arrays in 48. The outputs from each subarray are applied through the central adaptive processor and used to adjust the weighting vectors from one sub-array to the next as illustrated by the feedback path. The algorithm of the central adaptive processor can be any of the known algorithms. This iterative process is continued with the central adaptive processor 50 producing the array output 54.

FIG. 7 is a schematic diagram of one embodiment of a Frost array processor as modified in accordance with the present invention. In this embodiment five detectors or antennas 60 are employed and the signals from the sensors 60 are processed in three overlapping sub-arrays (e.g. S1-S2-S3, S2-S3-S4, S3-S4-S5). Signals from each detector are transmitted through three delay units or registers 62 (total time delay of Z) thus providing four signal nodes 64 in each antenna circuit. The signals at each node 64 are applied through the three position switching circuitry shown at 66 to the weighting vectors 68 and thence to the summer 70. The summed output from 70 is processed by an adaptive algorithm processor 72 and fed back to adjust the weighting vectors 68, as each subgroup is processed. The summed output from 70 for each set of three sub-groups as taken at the output of summer 70, and the first two sub-groups are delayed by registers 74 and 76. The outputs of summer 70 and registers 74 and 76 are then summed and averaged at 78 to produce the output signal. The summed total from summer 78 is applied through a switch 80 as the output.

Timer 84 controls the positioning of switches 66, switches 90, and the output switch 80 in order to synchronize flow of signals and data from each sub-array to the adaptive algorithm processor 72. For any particular signal or snapshot, three sub-groups at four different levels, or 12 measurements, must be applied to the summer 70. Switches 66 must toggle from one position to the next in $\frac{1}{3}$ the delay time period, $z^{-1}$, or $z^{-1}/3$. Switch 80 and switch 90 are closed once for every $z^{-1}$ time period.

Thus, rather than processing individually each of a plurality of detected signals and then summing the individually weighted delayed signals, the plurality of signals at each instant in time (or snapshot) are divided into overlapping sub-groups and the sub-groups are processed in succession. The weighting vectors in the array are adjusted in response to all subgroup inputs as processed by the adaptive algorithm. This on-line spatial smoothing is able to overcome the degradation of performance in coherent receiving environments without considerably increasing the complexity of the system structure or the computational burden.

Following is a mathematical analysis of the adaptive signal processing array in accordance with the invention.

The Optimum Weight Vector for Linear Beamforming Arrays

Consider a linear array, shown in FIG. 8, with M equally spaced elements, and K plane waves incident on it at distinct angles $\{\theta_i, i=0, \ldots K-1\}$; assume that the incident waves arise from K independent sources.

We assume that the *desired signal* is at direction $\theta_0$ and is a narrow band waveform in time of the form $$s(t) = p_0 e^{j\omega_0 t + \phi_0}$$

Complex (analytic signal) notation will be used throughout, and a superscript * will be used to denote complex conjugate (transpose, in the matrix case). Assume that the other $K-1$ signals are *interfering* or *jamming* signals of the form $$j_i(t) = p_i e^{j\omega_i t + \phi_i}, \quad i=1,2,3,\ldots,K-1$$

and define the column vector $$s(t) = \begin{bmatrix} s(t) \\ \\ j(t) \end{bmatrix} = \begin{bmatrix} s(t) \\ j_1(t) \\ \vdots \\ j_{K-1}(t) \end{bmatrix}.$$

Denote the direction (or steering) vector of the i-th source by $$a(\tau_i) = [1 \, e^{-j\omega_i \tau_i} \ldots e^{-j(M-1)\omega_i \tau_i}]^T$$

where $$\tau t_i = d \cos \theta_i / c,$$

c being the propagation velocity of the plane waves, and d being the spacing between adjacent elements of the linear array. Also denote $$A = [a(\tau_0) \ldots a(\tau_{K-1})]$$

Then also assuming additive while Gaussian measurement noise at each element, the received signals at the array can be written $$x(t) = As(t) + v(t) + v(t)$$
$$= a(\tau_0)s(t) + \overline{A}j(t) + v(t)$$

where A is an $M \times K$ matrix and $\overline{A}$ is $M \times (K-1)$.

The array output will be denoted $$y(t) = w^* x(t)$$

where w is a weight vector to be determined according to some criterion. There are several criteria that have been used. We shall start with two of them: the signal to noise ratio (SNR) and the Minimum Variance (MV) criteria. It is easy to shown, that for these criteria, the optimum vector is of the form $$w_{opt} = \alpha R_{xx}^{-1} a(\tau_0)$$

where $R_{xx} = E x(t) x^*(t)$ is assumed to be independent of t and $\alpha$ is a scalar proportionality constant, whose exact value depends on the particular criterion being used.

The two criteria named above are particularly relevant to so-called sidelobe cancellation problems where the desired signal (from the direction $\theta_0$) is assumed to be small in comparison to the interfering signals—the Howells-Applebaum assays are of this type.

In more sophisticated array systems, additional constraints are often imposed. For example, we may wish to estimate a desired signal, d(t), with known cross covariance function $r_{zd} = Ex(s+t)d(s)$ (see Griffiths[29]). Then under a minimum mean-square criterion, the optimum weight vector is of the form $$w_{opt} = R_{\chi\chi}^{-1} r_{\chi d}.$$

Another type of constraint arises from using a maximum likelihood criterion, (Kelly and Levin[30]), or a slightly more general version from due to Frost[14], which we shall describe in the following form:

Choose w to minimize the array output power $$Ey^2(t) = w^* R_{\chi\chi} w$$

under the constraint $$w^* c = 1$$

where c is an appropriately defined vector. For example, if the signal or "look" direction is known, then we could choose $$c = a(\tau_0).$$

If we let $$c^* = [0 \ldots 1]$$

then we obtain the so-called power-inversion adaptive array (see Compton[31]), which is a variant of the Howells-Applebaum array. In any case, the optimum weight vector under the contraint $w^* c = 1$ can readily be seen to be $$w_{opt} = \alpha R_{xz}^{-1} c$$

where $$\alpha^{-1} = c^* R_{\chi\chi}^{-1} c.$$

The point really is that several criteria lead to the same optimum weight vector.

In next section, we shall study the performance of the optimum array in terms of its beampattern.

Beam Patterns for Noncoherent and Coherent Incident Signals

The beam pattern of the array is obtained by plotting $$w_{opt}^* a(\tau)$$

where $$\tau = d \cos \theta / c, \quad 0 \leq \theta \leq 2\pi.$$

Explicit analytical expressions are difficult to obtain, but we can obtain insight into the interference rejection properties of the array by the following asymptotic (high SNR) analysis.

We shall assume that we are interested in the signal s(t) in the known look direction $\theta_0$, and that this signal is statistically independent of the (interfering) signals from the other unknown directions $\{\theta_1, \ldots, \theta_{K-1}\}$.

If in addition there are no fixed relations between the phases of signals, or more generally if none of the signals is a scaled and shifted version of any other signals we shall say that the signals are *completely noncoherent*.

Noncoherent Signals

Under the assumptions of statistical independence and of noncoherence, we shall express the received signal as $$x(t) = a(\tau_0) s(t) + \bar{A} j(t) + v(t)$$

where $\bar{A}$ specifies the interference directions $$\bar{A} = [a(\tau_1) \ldots a(\tau_{K-1})].$$

The covariance of x(t) can now be written $$R_{\chi\chi} = p_0^2 a(\tau_0) a^*(\tau_0) + R_{\chi\chi}$$

where $$R_{xz} = \bar{A} R_{jj} \bar{A}^* + \sigma^2 I$$

and we have assumed, for simplicity, the noise intensity, $\sigma^2$, to be same at each sensor.

By using the easily verified matrix identity $$(A + BCD)^{-1} = A^{-1} - A^{-1} B(C^{-1} + D A^{-1} B)^{-1} D A^{-1}$$

with $$A = R_{\chi\chi}, \quad B = a(\tau_0) p_1 = D^*, \quad C = 1,$$

we can write $$\begin{aligned} w_{opt} &= \alpha R_{xz}^{-1} a(\tau_0) \\ &= \alpha \left[ R_{xz}^{-1} a(\tau_0) - p_0^2 \frac{R_{xz}^{-1} a(\tau_0) \cdot a^*(\tau_0) R_{xz}^{-1} a(\tau_0)}{1 + p_0^2 a^*(\tau_0) R_{xz}^{-1} a(\tau_0)} \right] \\ &= \beta \cdot R_{xz}^{-1} a(\tau_0) \end{aligned}$$

where $\beta$ is a scalar constant.

We also introduce the modal representation $$\bar{A} R_{jj} \bar{A}^* = \sum_{i=1}^{K-1} \lambda_i e_i e_i^*,$$

where $\{\lambda_i\}$ and $\{e_i\}$ are the nonzero eigenvalues and the corresponding eigenvectors of the $M \times M$ matrix $\bar{A} R_{jj} \bar{A}^*$, which will have rank $K-1$ because $R_{jj}$ is the covariance matrix of the $K-1$ noncoherent signals.

Finally we shall also assume that the background measurement noise intensity is small compared to the signals j(t), so that we shall have $$\lambda_i >> \sigma^2$$

and $$\frac{1}{\sigma^2} >> \frac{1}{\lambda_i + \sigma^2}.$$

Then we can write $$w_{epl} = \beta R_{zz}^{-1} a(\tau_0)$$

$$= \beta \left\{ \sum_{i=1}^{K-1} \frac{1}{\lambda_i + \sigma^2} e_i e_i^* + \sum_{i=K}^{M} \frac{1}{\sigma^2} e_i e_i^* \right\} a(\tau_0)$$

$$\doteq \frac{\beta}{\sigma^2} \sum_{i=K}^{M} \rho_i e_i, \rho_i = e_i^* a(1),$$

where $\doteq$ denotes asymptotic (as $\sigma^2 \to 0$) equality.

Now by construction, the direction vectors $\{a(\tau_2), \ldots, a(\tau_K)\}$ of the interfering signals, which are the columns of the matrix $\overline{A}$, lie in the span of the first $K-1$ eigenvectors $\{e_1, \ldots, e_{K-1}\}$ and are therefore orthogonal to the *remaining eigenvectors* $\{e_K, \ldots, e_M\}$.

Therefore, we shall have $$w_{epl}^* a(\tau_l) \doteq \frac{\beta}{\sigma^2} \sum_{i=K}^{M} \rho_i e_i^* a(\tau_l) = 0 \; l = 2, \ldots, K,$$

so that the beam pattern will have "deep nulls" in the interference directions. In the look direction, on the other hand, the constraint will ensure that we have $$w_{opt}^* a(\tau_0) = 1.$$

This is the well known behaviour of the linear array, which can be approximately achieved by a variety of adaptive algorithms[11].

However, the situation deteriorates badly in the coherent case.

Coherent Signals

If the signals have *fixed* phase differences, which rally means equal frequencies and fixed $\phi_i$, then we shall have the representation $$As = a(\tau_0)s(t) + \sum_{i=1}^{K-1} a(\tau_i) j_i(t)$$

$$= [a(\tau_0) + \gamma_1 a(\tau_2) + \ldots + \gamma_{K-1} a(\tau_{K-1})] s(t)$$

where the $\{\gamma_i\}$ are fixed complex constants given by $$\gamma_i = (p_i/p_0) e^{j(\phi_1 \phi_0)}, i = 1, \ldots, K-1$$

In this case, the covariance matrix, $AEss^*A^*$, will have rank 1, so that it will have only one nonzero eigenvalue $\lambda_1$, and the covariance matrix $R_{\chi\chi}$ will have $M-1$ eigenvalues equal to $\sigma^2$.

Therefore we shall have $$w_{epl} = \alpha R_{zz}^{-1} a(\tau_0)$$

$$= \alpha \left[ \frac{1}{\lambda_1 + \sigma^2} e_i e_i^* + \sum_{i=2}^{M} \frac{1}{\sigma^2} e_i e_i^* \right] a(\tau_0)$$

$$\doteq \alpha \sum_{i=2}^{M} \frac{1}{\sigma^2} (e_i^* a(\tau_0)) e_i$$

All we can say here is that the linear combination $$b := a(\tau_0) + \gamma_2 a(\tau_1) + \ldots + \gamma_K a(\tau_{K-1})$$

will be orthogonal to the $\{e_2, \ldots, e_M\}$. This does not, however, imply that the same will be true of the $\{a(\tau_1), \ldots, a(\tau_{K-1})\}$ individually, and therefore there will not in general be any nulls in the directions of the interfering signals.

Due to the constraint, we shall have $$w_{opt}^* a(\tau_0) = 1$$

but this is of small comfort, because the actual array output will be $$y(t) = w_{epl}^* x(t)$$

$$\doteq |(*a \left[ \sum_{i=2}^{M} \frac{1}{\sigma^2} (e_i^* a(\tau_i)) e_i^* \right] [bs(t) + v(t)]$$

where we recall that $$b := a(\tau_0) + \sum_{i=2}^{M} \tau_i a(\tau_i)$$

lies along $e_1$ and is orthogonal to $\{e_2, \ldots, e_M\}$. Therefore there will be no signal output from the conventional array when the signals are coherent.

A Way Out

This analysis also makes clear what is necessary to rescue the situation: we must somehow restore the rank of the covariance matrix $E(As)(As)^*$ to being K. Then the noise-alone eigenvectors will be orthogonal to all the vectors in the space of the signals (desired signal and interfering signals) and the beam pattern will have nulls in the directions of the interfering signals.

A New Adaptive Array System

We shall describe a preprocessing scheme for the sensor outputs that will restore the rank of the signal covariance matrix to K even if the signals are completely coherent with each other.

The scheme is based on combining measurements from overlapping subarrays.

Given the M sensor outputs at any time instant, $$x(t) = [\chi_1(t) \ldots \chi_M(t)]^T,$$

define p subsets (recall that K is the number of sources)

$$z^{(1)}(t) = [\chi_1(t) \ldots \chi_{K+1}(t)]^T$$

$$z^{(2)}(t) = [\chi_2(t) \ldots \chi_{K+2}(t)]^T$$

$$z^{(p)}(t) = [\chi_p \ldots \chi_{K+p}(t)]^T.$$

Define $$R_{zz}^{(k)} = E z^{(k)} z^{(k)*}$$

and the spatial smoothed correlation matrix:

$$\overline{R} = \frac{1}{p} \sum_{k=1}^{p} R_{xz}^{(k)}$$

Then we shall prove in Appendix I (Theorem I) that $\overline{R}$ will have the form $$\overline{R} = \overline{ASA}^* + \sigma^2 I$$

where $\overline{S}$ will have rank K if and only if $p \geq K$.

Once $\bar{S}$ has rank K, then the noise eigenvectors will be orthogonal to the columns of A and by the analysis of Section III, will give nulls in the interference directions. The definition of $z^{(k)}$ shows that $K+p=M$ and this combines with the constraint on p to require that $$M=K+p\geq 2K$$

Therefore for this scheme to work, we must have at least twice as many sensors as signal sources.

Coherent Subgroups

If there are some coherent source inputs and some noncoherent inputs, we should divide the sources into G noncoherent subgroups within each of which the inputs are completely coherent. Then we form a matrix $$\bar{R}=\bar{R}_1+\ldots+\bar{R}_G$$

To destroy the coherency in all of the groups, the total number of subgroups must be at least equal to the size of the largest subgroup.

With these results in hand, we can now explain how to do adaptive processing of the sensor outputs.

Adaptive Processing

We can rewrite the expression for the estimate of $\bar{R}$ from N data snapshots as $$\hat{\bar{R}}_N = \frac{1}{p}\sum_{k=1}^{p}\left[\frac{1}{N}\sum_{j=1}^{N} z_j^{(k)}z_j^{(k)*}\right]$$

$$= \frac{1}{Np}\sum_{j=1}^{N}\sum_{k=1}^{p} z_j^{(k)}z_j^{(k)*}$$

where the subscript j denotes the j-th time instant, i.e.

$$z_j^{(k)}=[x_k(j),\ldots,x_{K-1+k}(j)]$$

and the 'hat' signifies an estimated quantity.

Then $$\hat{\bar{R}}_{N+1} = \frac{1}{(N+1)p}\sum_{j=1}^{N+1}\sum_{k=1}^{p} z_j^{(k)}z_j^{(k)*}$$

$$= \frac{1}{(N+1)p}\sum_{j=1}^{N}\sum_{k=1}^{p} z_j^{(k)}z_j^{(k)*} + \frac{1}{(N+1)p}\sum_{k=1}^{p} z_{N+1}^{(k)}z_{N+1}^{(k)*}$$

$$= \frac{N}{(N+1)}\hat{\bar{R}}_N + \frac{1}{(N+1)p}\sum_{k=1}^{p} z_{N+1}^{(k)}z_{N+1}^{(k)*}$$

This expression suggests that we can recursively update the inverse of $\bar{R}$ by using the matrix inversion lemma iteratively p times once for each $\{z^{(k)}\}$. If follows that we can also use approximate gradient-type adaptive algorithms (e.g. the LMS algorithm of Widrow and Hoff) to update the weights of the adaptive processor.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. An adaptive signal processing array comprising a plurality of signal detectors,
   a plurality of variable weighting means each connected to one of said signal detectors for weighting signals from said detectors,
   means for grouping said weighting means into sub-groups of less than all of said plurality of weighting means for weighting sub-groups of signals,
   first summing means connected with said subgroups of weighting means for summing said weighted signals of each sub-group and producing a first summed signal,
   means including an adaptive algorithm processor for operating on said first summed signal and producing a feedback signal, and
   means connecting said feedback signal to said plurality of variable weighting means for adjusting the variable weights thereof.

2. The adaptive signal processing array as defined by claim 1 wherein each of said plurality of variable weighting means includes a plurality of serially connected timed delay means for storing sequentially delayed signals, and means for weighting said sequentially delayed signals.

3. The adaptive signal processing array as defined by claim 1 and further including a signal detector for providing a reference signal, and second summing means for summing said reference signal and said first summed signal and producing a second summed signal, said adaptive algorithm processor operating on said second summed signal including said first summed signal and said reference signal.

4. An adaptive process for suppressing interference of coherent and non-coherent signals with a desired signal, said method comprising the steps of
   detecting signals with a plurality of detectors,
   weighting signals detected by each of said plurality of detectors by variable weighting means thereby obtaining weighted signals,
   grouping said weighted signals in sub-groups of less than all of said weighted signals,
   summing each sub-group of weighted signals and obtaining a first summed signal,
   operating on said first summed signal with an adaptive algorithm to obtain a feedback signal, and
   applying said feedback signal to said variable weighting means for varying the weights thereof.

5. The method as defined by claim 4 and further including the step of delaying each of said detected signals to obtain a plurality of delayed signals, weighting each of said delayed signals, and grouping said weighted delayed signals in subgroups of less than all of said weighted delay signals, and summing each sub-group of weighted signals having the same time delay, operating on said summed signals having the same time delay with an adaptive algorithm to obtain feedback signals, and applying said feedback signals to said variable weighting means.

6. The method as defined by claim 4 and further including the step of detecting a reference signal, and summing said reference signal with said first summed signal and producing a second summed signal, and operating on said second summed signal including said first summed signal and said reference signal with said adaptive algorithm to obtain said feedback signal.

* * * * *